United States Patent [19]

Jacobson

[11] Patent Number: 5,044,688
[45] Date of Patent: Sep. 3, 1991

[54] METHOD AND APPARATUS FOR VEHICLE BODY RESURFACING

[76] Inventor: Roger J. Jacobson, Fleming Rte., Box 53, Aitkin County, Minn. 56431

[21] Appl. No.: 396,221

[22] Filed: Aug. 21, 1989

[51] Int. Cl.$^5$ ............................................. B60J 11/00
[52] U.S. Cl. ..................................... 296/136; 296/191
[58] Field of Search ......................... 296/136, 901, 191

[56] References Cited

U.S. PATENT DOCUMENTS

| 4,041,999 | 8/1977 | Miller | 296/136 X |
| 4,531,560 | 7/1985 | Balanky | 296/136 X |
| 4,564,232 | 1/1986 | Jujimori et al. | 296/191 X |
| 4,589,459 | 5/1986 | Lantrip | 296/136 X |
| 4,734,312 | 3/1988 | Sugiyama | 296/136 X |

FOREIGN PATENT DOCUMENTS

| 3807667 | 10/1989 | Fed. Rep. of Germany | 296/136 |
| 2543891 | 10/1984 | France | 296/136 |

OTHER PUBLICATIONS

J. C. Whitney and Co., May 1988, Catalog No: 495L, pp. 53, 54, and 69.

Primary Examiner—Margaret A. Focarino
Assistant Examiner—Joseph P. Pape
Attorney, Agent, or Firm—Henry C. Kovar

[57] ABSTRACT

A kit having a plurality of reinforced rigid resurfacing panels for conformal application upon and over damaged and/or corroded original body panels of a motor vehicle, with an improved method of securement utilizing spaced apart upper edge and central area bonding with adhesive applied in strips to the original panels. The resurfacing panels have an upper edge to register with an existing crease or trim line in the original vehicle body, and the resurfaced vehicle has new permanent body panels all around from the crease or trim lines down.

20 Claims, 2 Drawing Sheets

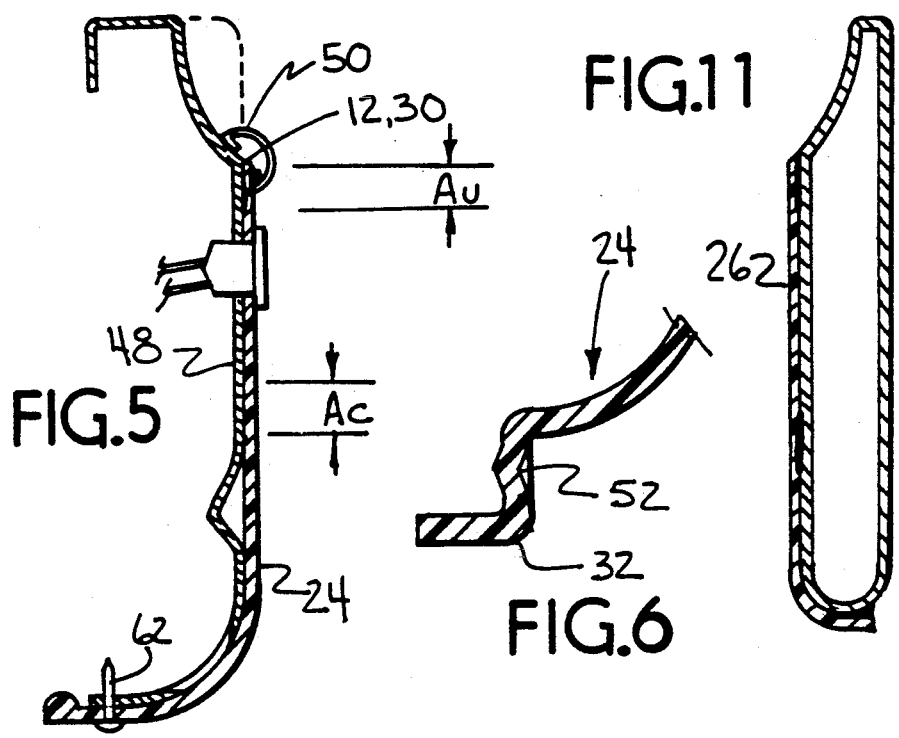
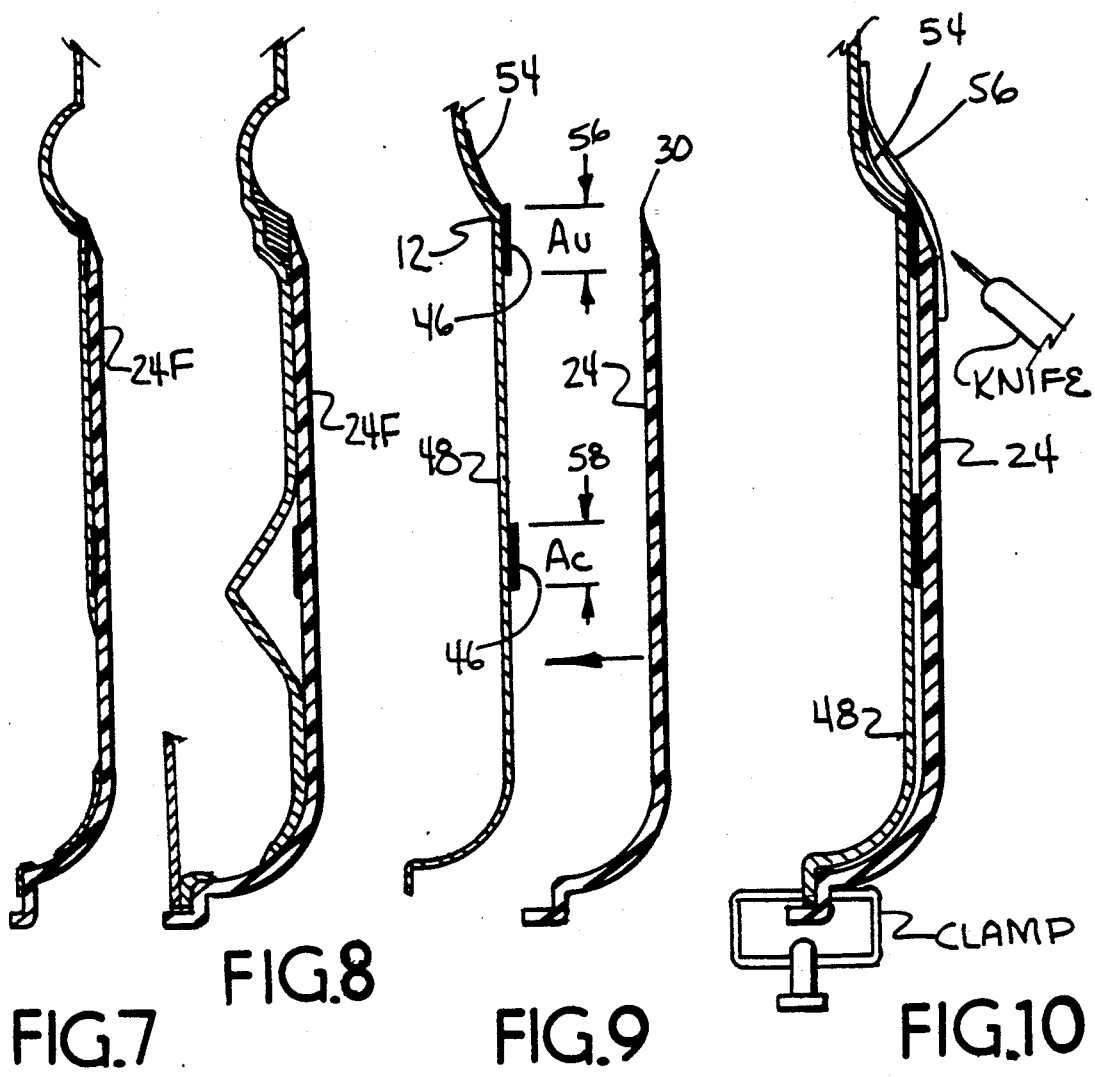

METHOD AND APPARATUS FOR VEHICLE BODY RESURFACING

BACKGROUND OF THE INVENTION

1. Field of the Invention

This invention pertains to a method and apparatus for providing a new permanent vehicle body panel and surface atop of the original body panel; the invention being particularly useful for repair on corroded and/or damaged vehicle bodies.

2. Prior Art

There are a number of vehicle protectors in the prior art. In U.S. Pat. Nos. Drake 1,584,158; Muciaccia 2,623,481; Bookman 2,557,673; Sasahi 3,665,355; Haltenberger 2,613,085 and Miller 4,041,999 a number of vehicle protection devices are taught. Drake uses a fitted top cover held in place with separate fasteners to secure the cover in place. Muciaccia uses plastic material held in place by the use of a cemented metallic strip with integral clips. Bookman has a front fender skirt of a proper shape to allow the front wheels to turn. Sasahi uses magnets sandwiched within flexible sheets to attach the sheets to a vehicle. Haltenberger uses a front wheel cover shaped to direct air within the wheel opening to insure that slush and mud are not deposited within the opening and interfere with steering. Miller uses a number of plastic sheets having one surface covered with a soft resilient material for padding held in place on the vehicle by snap or hook fasteners.

Further prior art includes Hirose 4,635,996 which has a covering sheet of fabric or flexible synthetic resin which may cover the outer body of a vehicle. Balanky, 4,531,560 has a protective cover made of any tough non-abrasive, tear-resistant material in flexible sheet form and which is held on to the outside of a vehicle body by bendable clasp members and magnets. Durben 4,227,718 has a molded plastic stone guard for the leading part of a body fender which is fastened to a Corvette rear fender by a release paper covered pressure sensitive adhesive strip on its upper end, and on its lower end by existing or original rocker panel screws. Cohen 2,119,072 is a fabric fender cover located and held in position by suction cups and snap tabs. Mosgoffian 2,048,461 has a complete fabric vehicle cover held on by snap-on eyelets and zippers.

These protective devices do not address the problem of providing permanent protection, renewal, and appearance enhancement with a vehicle body cover panel that is easy to apply and that will bridge existing dents and gaps and corroded areas with no external evidence of these flaws, which is economically viable.

Vacuum formed plastic panels have been tried to cover up rusted and dented fenders and doors. These have been found to cause several problems, including cold cracking, stress cracking, bubbling and bulging when heated by the sun, fitting and finishing and edging problems, and they are not liked by the body shop trade. These vacuum formed panels were secured to the original vehicle body by double backed tape on the top, and plastic rivets along the bottom. If the bottom edges of the original body were corroded away or damaged, these panels could not be fastened and supported along the bottom. Anywhere this original vehicle body was corroded or damaged presented a problem because the vacuum formed panels could not be supported.

There remains a significant problem in repair, restoration and resurfacing of vehicle bodies, that has not yet been successfully addressed.

OBJECTS OF THE INVENTION

It is an object of this invention to provide a new and improved method and apparatus for resurfacing vehicle panels and bodies.

It is a further object of this invention to provide a new and improved outer panel for resurfacing a vehicle body.

It is a further object of this invention to provide a vehicle having an improved resurfaced body.

It is a further object of this invention to provide a new and improved kit for resurfacing vehicle bodies.

It is a further object of this invention to provide a new and improved method of resurfacing a vehicle body.

SUMMARY OF THE INVENTION

A motor vehicle outer body panel has a preformed structurally reinforced rigid panel with an upper edge conformal to a body crease or trim line, a lower edge conformal to an original bottom edge, upright edges conformal to upright original edges, an outer cosmetic surface, edge bonding structure on a structural quality backside surface, and central bonding structure on the backside surface.

A motor vehicle having a resurfaced body has at least one original metal body panel, a preferred substantially rigid reinforced resin outer body panel secured to and covering the original panel, adhesive structurally bonding upper and upright edges of the resin panel to the original body panel, structure for fixing the resin panel lower edge in position, and a cosmetic outer surface spaced from the original panel and presenting a visual replica thereof.

A vehicle body resurfacing kit has a plurality of fiber re-inforced resin outer panels with upper edges which are registerable with a common crease or trim line in an original vehicle body, and adhesive bonding structure at the crease line and at a central strip spaced from the crease line.

A method oi resurfacing a vehicle body has the steps of providing at least one rigid outer panel which is conformable to the vehicle body, cleaning the body, applying adhesive on the panel backside in a particularily effective pattern, placing the panel and adhesive into position, pressing the outer panel and adhesive to the original body, holding the panel in position until the adhesive sets, and then trimming any excess adhesive.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 5 is an elevational view, in section, through lines V—V of FIG. 2;

FIG. 6 is an elevational view, in section, through lines VI—VI of FIG. 4;

FIG. 7 is an elevational view, in section and equivalent to FIG. 5, showing an alternative vehicle body;

FIG. 8 is an elevational view, in section, of the structure of FIG. 7 with geometric damage to the original vehicle body;

FIG. 9 is an elevational view, in section, for sequential description of the new method of this invention;

FIG. 10 is a view sequentially following FIG. 9, and

FIG. 11 is an elevational view, in section, through lines XI—XI of FIG. 2.

DESCRIPTION OF THE PREFERRED EMBODIMENT

Figure 1:
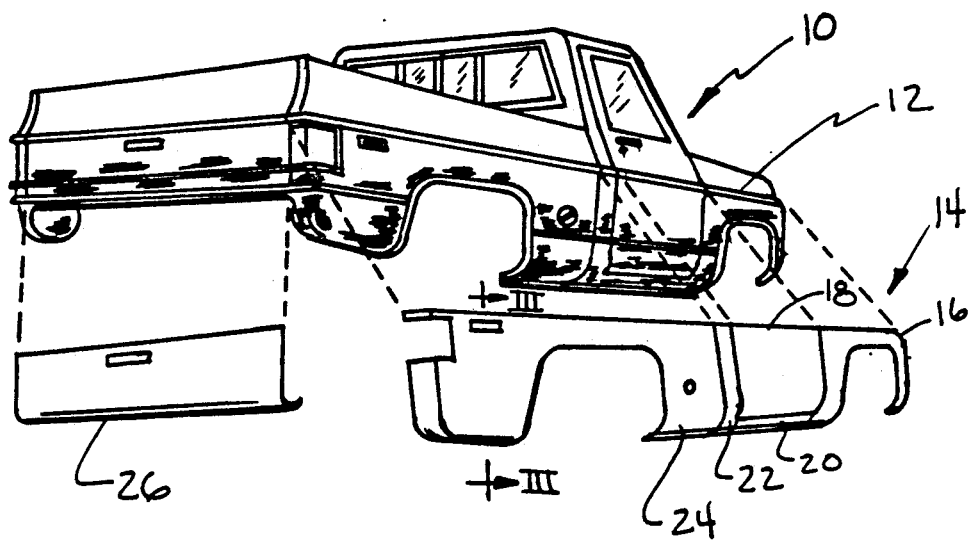
FIG. 1 is an isometric view of a motor vehicle body with several of the resurfacing outer panels oriented for subsequent attachment.

In accordance with the principles of the present invention, a vehicle needing to be resurfaced is shown in FIG. 1 and generally indicated by the numeral 10. This vehicle will typically have rust and corrosion damage as well as dings and dents. Most, if not all, of this damage will be on the lower part of the vehicle 10 and will be below a trim line formed by a longitudinal crease 12 in the vehicle 10 sheet metal body or defined by a longitudinal molding strip. The crease 12 typically extends the length of the vehicle 10 and is a generally straight line extending through the front fender, door, cowl, box, and tailgate. The specific vehicle 10 illustrated is a pickup having a current General Motors body. Other vehicle types such as vans, cars, large trucks from various manufacturers are also within the scope of this invention.

Shown in FIG. 1 with the vehicle 10 to be resurfaced, is a kit of outer or resurfacing panels generally indicated by the numeral 14. The vehicle resurfacing kit 14 includes a plurality of outer resurfacing panels, specifically a front fender panel 16, a door panel 18, a rocker panel 20, a cowl panel 22, a rear fender or box panel 24, and a rear panel 26 which is shown as being a tailgate panel 26. The kit 14 will also include corresponding mirror image resurfacing panels (not shown) for the left side of the vehicle 10 which is the mirror image of the illustrated right side.

Each of the panels 16–26, is preformed to be conformal to the respective sheet metal on the vehicle 10 for which it is intended. Each of the panels 16–26 is made of a plastic resin and is reinforced with a multi-directional structural fiber. A preferred material is polyester resin reinforced by 1½ to 2 oz. fiberglass mat, or chopped fiberglass from a gun. The panels 16–26 will have an average thickness of 1/16 to ⅛ inch.

Figure 3:
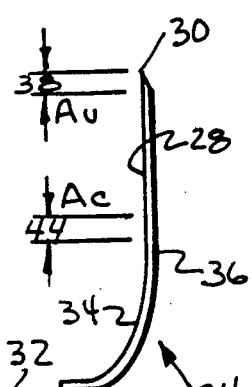
FIG. 3 is an elevational view, in section through lines III—III of FIG. 2.
Figure 4:
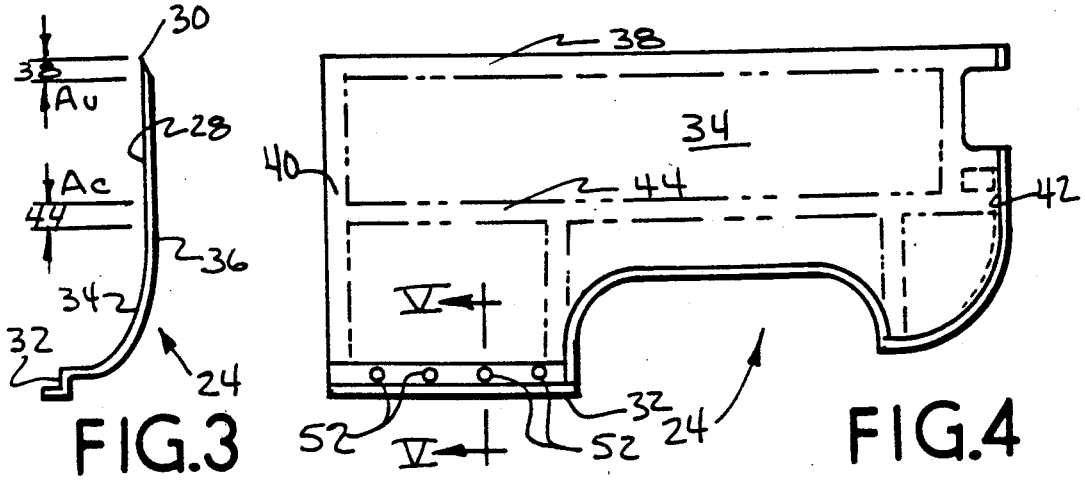
FIG. 4 is an elevational view of the backside of the structure shown in FIG. 3.

FIG. 3 illustrates a section through one of the panels 24. The panel 24, which has a section typical of all of the panels 16–26 has the structurally reinforced core 28, an upper edge 30 which is preferrably feathered and which is the thinnest part of the panel 24, a lower edge 32 which is preferrably the thickest part of the panel 24 and/or which may have an angled reinforcing section, a backside 34 which is a structural grade surface, and a cosmetic quality outer surface 36 which is preferrably a colored gel coat enabling use of the panels without painting. The backside 34 of the panel 24 is shown in FIG. 4 wherein an upper bonding area 38 is defined by a dotted marker line, as are upright edge bonding areas 40, 42. A central longitudinal bonding area 44 is positioned about midway in the height of the panel 24 and is spaced in between the upper and lower edges 30, 32 and is preferrably parallel to the upper edge 30 and upper bonding area 38.

The panels 16–26 are adhesively bonded to the original metal body of the vehicle 10, with a fiberglass panel adhesive. A preferred adhesive for this purpose is Bondo brand adhesive number 428 from Dynatron/Bondo Corporation, Atlanta GA, and Anaheim, CA. This particular adhesive is thixotropic and does not flow unless subjected to an external force. This adhesive will not drip or flow under the force of gravity. The adhesive is designated in the drawings by the numeral 46.

The panel 24 is shown adhesively secured to an original fender panel 48 in FIG. 5 with the top edge 30 being registered flush with the trim or crease line 12. Any original or optional trim or decour 50 may be installed or re-installed just above or over the upper edge 30. The original fender panel 48 will usually have rust and corrosion holes, and/or indentation damage as clearly shown in FIGS. 1, 5, 7 & 8.

Each resurfacing panel 16–26 may be provided with fastener designation locators 52 such as best shown in FIGS. 4 & 6. These locators 52 serve as starters for subsequent drilling of fastener holes as will be explained. These locators 52 are particularly useful along the lower edge 32.

Practice of the method of the invention, and usage of the panels 16–26 in the kit 14, will now be described and referenced to FIGS. 9 and 10. The original vehicle panel 48 to be resurfaced has a strip of masking tape 54 applied using the trim or crease line 12 as a guide. The tape 54 is placed immediately above the trim or crease line 12 and around the entire part of the vehicle 10 to be resurfaced. An upper area 56 of about 1–1½ inches wide is cleaned and abraided, preferably with a tool such as a body grinder; the method of this invention does not require clean grinding to bare metal, only a rough-up surface abraiding or grinding. Upright edges of the original panel 48 are likewise cleaned and abraided, preferably with a body grinder. A central area 58 also of about 1–1½ inches width is cleaned with a grinder. The central area 58 is about at the vertical mid-level between the upper area 56 and the bottom edge of the original panel 48; it should be in the range of ⅓ to ⅔ of the height from the bottom edge to crease line 12. The original panel 48 will then be treated with the standard cleaning and rust stopping chemical solutions found in automotive body shops. A strip of adhesive 46 is then applied to the entire length of the upper prepared area 56, to the cleaned and prepared upright ends of the original panel 48, and to the central area 58. The resurfacing panel 24 is then brought into position adjacent the original panel 48 and the upper edge 30 brought into registry with the crease line 12. The clamps shown along the bottom in FIG. 10 are then applied to hold the resurfacing panel 24 in position upon the original panel 48. The panel 24 is pushed into the adhesive 46 and then adjusted to its proper position wherein the upper edge 30 and trim or crease line 12 are flush. Strips of hold-up tape 64 are then fastened to the panel 24 and masking tape 54 to hold up the weight of the panel 24 and to hold the upper edge 30 tight against the original panel 48. Clamps on the lower edge 32 may then be applied and/or completely tightened to hold the panel 24 compliantly against the original panel 48. After the adhesive 46 sets up, but while the adhesive 46 is still green and not yet fully cured, the excess which has squeezed out above the upper edge 30, is trimmed off with a knife. Any excess adhesive 46 squeeze out of the upright ends 40, 42 is likewise trimmed off with a knife.

The lower edges 32 may be held in place by intrinsic stiffness of the fiber reinforcement in the resurfacing panels 16-26, by virtue of the two level 56, 58 bonding and the reinforced lower edge 32. If the bottom edge of the original body panel 48 has physical integrity, a nominal size drill bit may be used to drill a hole through the locators 52 and bottom edge of the original body panels 48, and appropriate plastic "christmas-tree" fasteners 62 or other blind fasteners may be used to optionally further secure the lower edge 32 in place. A specific example of this type of fastener is shown in Wayland Pat. No. 3,494,244.

FIGS. 7 & 8 illustrate a resurfaced panel 24F on the original body contour of a current truck vehicle by the Ford Motor Company, and further illustrates how damage, at the crease line 12F, can be filled with body filler after resurfacing with an appropriate body resurfacing kit 14F.

FIG. 11 illustrates a typical resurfaced pickup tailgate, where the resurfacing panel 26 preferably has a curl that extends under and is bonded to the tailgate.

Since the resurfacing panels 16-26 are reinforced and are quite stiff, they will only bend a small amount under the attaching pressure, consequently the sheet will not conform to dents in the vehicle 10 but will bridge over dents and only be secured on areas beyond the dented area. Any corrosion or holes in the vehicle 10 will also be bridged by the protective cover panel 16-26. Any damaged areas that project outward from the vehicle 10 can simply be hammered down before the reinforcing panel 16-26 is attached. The result on the resurfaced vehicle 60 will be a smooth new outer surface with no imperfections. A small spacing provided by the adhesive 46 between the resurfacing panels 16-26 and the original body panels 48 also acts as a noise barrier.

Figure 2:
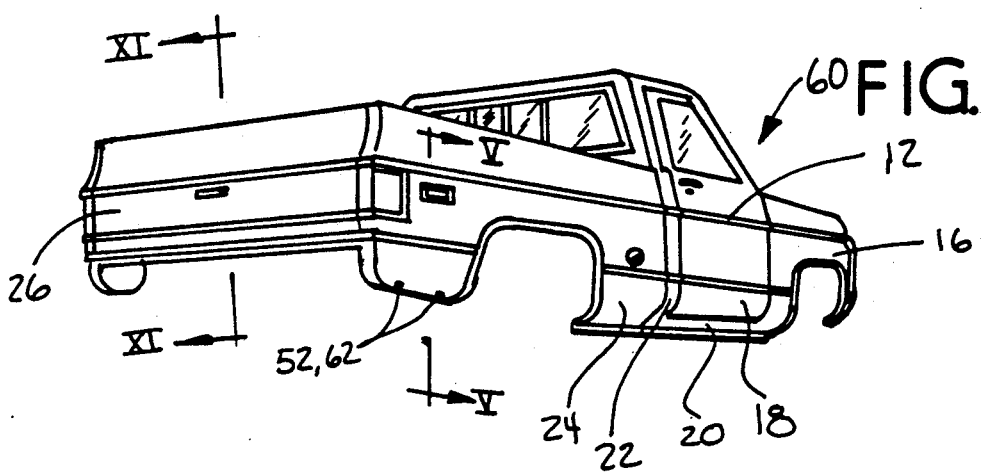
FIG. 2 is an isometric view of the vehicle of FIG. 1 with the outer panels attached.

Resurfacing panels 16-26 are shown attached to a resurfaced vehicle 60 in FIG. 2. Resurfacing panels 16-24 and their mirror image counterparts (not shown) on the left side of the resurfaced vehicle 60 will completely cover the original lower sheet metal of the lower portion of the vehicle 10. This kit 14 and these panels 16-24 not only protect the resurfaced vehicle 60 from further rusting but also restore its appearance to a like new condition. The panels 16-26 in the preferred version are preferably white to give the resurfaced vehicle 60 a two tone effect. It would be quite difficult to provide panels 16-26 in all available vehicle colors and additionally, some paints fade with exposure to the sun so a color mismatch would be a problem. Using white for the cosmetic gel coat outer surface 36 results in a color scheme that conforms to a common two tone paint arrangement and requires no color matching or painting, however if desired, the cosmetic gel coat 36 can be conventionally painted to match the original or new resurfaced vehicle 60 colors.

In FIG. 1 and 2 molding strips 50 are shown which each consist of a number of segments and wrap around the two sides and rear of the vehicle 10. Not all vehicles 10 have such molding 50, however some do as depicted here. For vehicles 10 with moldings 50, these moldings 50 must be removed before the resurfacing panels 16-26 are attached. The moldings 50 are re-attached to the vehicle 60 by means of mounting clips, and holes must be provided for these mounting clips. The result will be that the upper edge of the resurfacing panels 16-26 will be covered by or will be just under moldings 50 to enclose or cover the top edges of the panels 16-26.

Other areas requiring special treatment are the gas cap and light cover shown in FIGS. 1 and 2. Holes in the resurfacing panels 16-26 are sized to register with an to admit the gas cap and the light cover respectively. FIG. 3 shows a light cover protruding through a hole in panel 24. The upper edge 30 of each panel 16-26 is beveled or feathered to minimize the appearance of the edge of the panel 16-26 to assist in the resurfacing of the vehicle 10 by rendering the upper edges 30 inconspicuous. This is important for vehicles 10 which do not have a molding 50 along the upper edge of the resurfacing panel 16-26.

This process and these panels 16-26 provide a simple and economically viable method of returning a badly rusted and/or dented vehicle to a like new appearance. This process and these panels 16-26 not only enhance the appearance of the vehicle but also protects the most vulnerable lower portion of the vehicle from future damage.

The method and apparatus of this invention enable the manufacture, distribution and application of very large single piece panels, whereas plural piece panels were previously necessary. Most body shops and body repair people are familiar with the materials and individual procedural steps required to successfully implement this invention. These new resurfacing panels 16-26 do not buckle, bubble or blister in the heat, and do not crack, break or shatter in the cold. The resurfacing panels 16-26 can be attached and the usual step of repainting can be eliminated. The effective steps in application of the adhesive 46 and panels 16-26, prevents smearing of the adhesive 46 and enables precise and easy adjustment of the registration of the resurfacing panels 16-26 to the original panel 48. The hold up tape 64 and masking tape 54 are simply pulled off after trim of green adhesive 46 and the resurfaced vehicle 60 can be set aside to cure for a couple hours, and then be driven away.

It typically takes less than 4 hours to apply a complete resurfacing kit 14 to a damaged vehicle 10, to provide the new looking resurfaced vehicle 60. This is an extremely effective invention for resurfacing motor vehicles. This application and method of this invention permanently resurfaces a vehicle with rigid structurally self sufficient outer panels which will not corrode. The re-inforced panels 16-26 have the structural stiffness to hold the lower edge 32 in position at and against the bottom of the original panels.

Although other advantages may be found and realized and various modifications may be suggested by those versed in the art, it should be understood that 1 wish to embody within the scope of the patent warranted hereon, all such embodiments as reasonably and properly come within the scope of my contribution to the art.

I claim as my invention:

1. A motor vehicle body resurfacing panel, comprising
   (a) a preformed structurally reinforced and substantially rigid plastic resin panel having
      (1) a backside surface compliantly fittable directly upon and in contact with a rigid original body panel of a motor vehicle;
      (2) an upper edge conformal to an original longitudinal line in the original panel;

(3) a lower edge generally conformal to and below an original bottom edge of the original panel;

(4) upright edges generally conformal to original upright edges of the original panel, and (5) an outer cosmetic quality surface presenting a new exterior vehicle body surface to go over and outside of the original panel;

(b) edge bonding means on said backside surface and immediately adjacent said upper and upright edges for adhesive securement of said upper and upright edges to the original panel;

(c) central bonding means on said backside surface and spaced downward from said upper edge and upward of said lower edge for adhesive securement of said backside surface to the original panel; and (d) structural means for holding said lower edge in position adjacent to and enclosing the bottom edge, without bonding thereof.

2. The resurfacing panel of claim 1, in which said panel is fiber reinforced resin.

3. The resurfacing panel of claim 1, in which said upper edge is feathered to a lesser thickness than the remainder of the panel.

4. The resurfacing panel of claim 2, in which said lower edge has therein means for structurally reinforcing said lower edge.

5. The resurfacing panel of claim 4, in which said lower edge is the thickest portion of the panel.

6. The resurfacing panel of claim 1, in which said lower edge has designation means for mechanical securement of the lower edge to the original bottom edge, without bonding.

7. A motor vehicle having a resurfaced body, comprising (a) at least one original metal body panel in the body of the vehicle;

(b) a preformed substantially rigid reinforced plastic resin outer body resurfacing panel secured to and covering the original vehicle metal body panel, said resurfacing panel having a longitudinal length covering the length of the original panel, upright edges matched to upright edges of the original panel, a lower edge enclosing a bottom edge of the original body, and an upper edge which is conformal up to a longitudinal line in the original panel;

(c) adhesive structurally bonding said upper and upright edges to the original panel;

(d) structural means for fixing said lower edge in position adjacent the original bottom edge; and (e) a cosmetic outer surface on said resurfacing panel, said cosmetic surface being spaced from said original panel and presenting a visually indistinguishable replica thereof.

8. The vehicle of claim 7, in which said resurfacing panel covers the entire length of the original panel.

9. The vehicle of claim 7, in which said upper edge is covered by a molding.

10. The vehicle of claim 7, in which the lower edge and original bottom edge are mechanically fastened to each other.

11. The vehicle of claim 7, including a longitudinal central strip of adhesive bonding the resurfacing panel to the original panel, said central strip being spaced downward from the upper edge and being spaced upward from the lower edge.

12. The vehicle of claim 7, in which both sides of the vehicle are at least partially covered by a plurality of said resurfacing panels.

13. The vehicle of claim 7, in which the resurfacing panel covers the entire portion of the original panel which is below the longitudinal line.

14. The vehicle of claim 7, in which the resurfacing panel has a feathered upper edge and a reinforced lowered edge.

15. A vehicle body resurfacing kit comprising (a) a plurality of rigid fiber re-inforced resin outer body resurfacing panels each having a backside surface conformably fittable to a respective one of the original metal panels of the vehicle body and each having an outer cosmetic surface for visual presentation of a new vehicle body;

(b) upper edges on a plurality of said resurfacing panels, said upper edges all being registerable with a common longitudinal line in the vehicle body;

(c) adhesive bonding means for adhesively securing said resurfacing panel upper edges to the vehicle body along an upper strip immediately adjacent to and just below the body longitudinal line, and for adhesively securing said outer panel to the vehicle body along a central strip spaced below the longitudinal line and the upper strip.

16. The body resurfacing kit of claim 15, wherein the cosmetic surfaces are visual replicas of the surfaces of the original vehicle body.

17. The body resurfacing kit of claim 15, in which said kit is a truck body resurfacing kit in which said resurfacing panel upper edges match the longitudinal line along the length of at least one side of the truck body.

18. The body resurfacing kit of claim 15, including an outer tailgate panel for resurfacing an original tailgate of a pickup truck.

19. The body resurfacing kit of claim 15, including mechanical means for fastening lower edges of at least some of the resurfacing panels to bottom edges of the vehicle body, without the use of the adhesive bonding means.

20. The body resurfacing kit of claim 19, including fastener location designation structure in at least some of said resurfacing panels.

* * * * *